US012039778B1

United States Patent
Aldhyani et al.

(10) Patent No.: US 12,039,778 B1
(45) Date of Patent: Jul. 16, 2024

(54) METHOD OF PERFORMING RARE EVENT DETECTION IN VIDEO

(71) Applicant: KING FAISAL UNIVERSITY, Al-Ahsa (SA)

(72) Inventors: Theyazn Hassn Hadi Aldhyani, Al-Ahsa (SA); Melfi Alrasheedi, Al-Ahsa (SA); Abdullah H. Al-Nefaie, Al-Ahsa (SA); M. Irfan Uddin, Kohat (PK); Asim Wadood, Kohat (PK); Muhammad Adnan, Kohat (PK)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/389,573

(22) Filed: Nov. 14, 2023

(51) Int. Cl.
*G06V 20/40* (2022.01)
*G06T 7/20* (2017.01)
*G06V 10/74* (2022.01)

(52) U.S. Cl.
CPC ............... *G06V 20/44* (2022.01); *G06T 7/20* (2013.01); *G06V 10/761* (2022.01); *G06V 20/46* (2022.01); *G06T 2207/20081* (2013.01)

(58) Field of Classification Search
None
See application file for complete search history.

(56) References Cited

U.S. PATENT DOCUMENTS

2020/0134804 A1* 4/2020 Song .................... G06V 10/764

FOREIGN PATENT DOCUMENTS

IN 202021003602 A 7/2021

OTHER PUBLICATIONS

Yu et al., "Abnormal Event Detection and Localization via Adversarial Event Prediction", Aug. 2022, IEEE Transactions on Neural Networks and Learning Systems, vol. 33, No. 8., pp. 3572-3586. (Year: 2022).*
Yu, Jongmin, et al. "Abnormal event detection and localization via adversarial event prediction." IEEE transactions on neural networks and learning systems 33.8 (2021): 3572-3586.
Schlegl, Thomas, et al. "f-AnoGAN: Fast unsupervised anomaly detection with generative adversarial networks." Medical image analysis 54 (2019): 30-44.

(Continued)

*Primary Examiner* — James M Anderson, II
(74) *Attorney, Agent, or Firm* — Nath, Goldberg & Meyer; Richard C. Litman

(57) ABSTRACT

A video analysis technique is implemented using a modification of a Wasserstein Generative Adversarial Network (WGAN), named Spatial-Temporal Diverse Augmentation in Generative Models for Rare Event Synthesis (STAGES). A sequence of video images is received and features of the video images are identified. The STAGES technique is used to identify unusual or notable features found in frames of the video sequence as identified features, using spatial and temporal generators and discriminators to capture both spatial and temporal patterns in videos and thereby accurately detect rare events in complex situations. The video is then scanned for the identified features.

8 Claims, 2 Drawing Sheets

(56) References Cited

OTHER PUBLICATIONS

Akcay, Samet, Amir Atapour-Abarghouei, and Toby P. Breckon. "Ganomaly: Semi-supervised anomaly detection via adversarial training." Computer Vision—ACCV 2018: 14th Asian Conference on Computer Vision, Perth, Australia, Dec. 2-6, 2018, Revised Selected Papers, Part III 14. Springer International Publishing, 2019.

Zenati, Houssam, et al. "Adversarially learned anomaly detection." 2018 IEEE International conference on data mining (ICDM). IEEE, 2018.

Kwon, Junseok. "Rare-Event Detection by Quasi-Wang-Landau Monte Carlo Sampling with Approximate Bayesian Computation." Journal of Mathematical Imaging and Vision 61 (2019): 1258-1275.

Hamaguchi, Ryuhei, Ken Sakurada, and Ryosuke Nakamura. "Rare event detection using disentangled representation learning." Proceedings of the IEEE/CVF Conference on Computer Vision and Pattern Recognition. 2019.

Liu, Hui, et al. "An anomaly detection method based on double encoder-decoder generative adversarial networks." Industrial Robot: the international journal of robotics research and application 48.5 (2021): 643-648.

\* cited by examiner

METHOD OF PERFORMING RARE EVENT DETECTION IN VIDEO

BACKGROUND

Technical Field

The present disclosure relates to video analysis, and particularly to a method of performing rare event detection. Specifically, the disclosure relates spatial and temporal diverse augmentation in generative models for rare event detection in video, such as in video surveillance.

Background Art

Early GAN-based rare event detection methods implementing specialized Generative Adversarial Networks (GAN) such as Anomaly Detection GAN (AnoGAN), Semi-Supervised Anomaly Detection via Adversarial Training (GANomaly), and Adversarially Learned Anomaly Detection (ALAD) focuses on learning image representations through reconstruction have been developed. AnoGAN pioneered this by modeling normality in retinal optical coherence tomographic data. GANomaly uses conditional GANs to learn both image and latent space generation for rare event detection. ALAD introduced a theory and employs three discriminators for improved rare event detection by constraining data distribution in the latent space. These methods, although significant, face limitations such as small image patch constraints, training instability, and high resource requirements for inference. Nonetheless, they paved the way for leveraging GANs in rare event detection, laying the foundation for future advancements in this domain.

Supervised machine learning and deep learning techniques have been extensively explored for rare event detection. Augmentation techniques such as oversampling, undersampling, Synthetic Minority Over-sampling Technique (SMOTE), etc. have been commonly used to address the issue of imbalanced training data.

Video surveillance plays a critical role in identifying rare incidents such as accidents, crimes, or anomalies, which are infrequent compared to regular activities. This underscores the demand for intelligent computer vision algorithms that can automatically detect such events in videos, streamlining manual efforts and saving time.

SUMMARY

A video analysis technique is implemented using a modification of a Wasserstein Generative Adversarial Network (WGAN), named Spatial-Temporal Diverse Augmentation in Generative Models for Rare Event Synthesis (STAGES). A sequence of video images is received and features of the video images are identified. STAGES is used to identify unusual or notable features found in frames of the video sequence as identified features. The STAGES technique comprises spatial and temporal generators and discriminators to capture both spatial and temporal patterns in videos and thereby accurately detects rare events in complex situations. The video is then scanned for the identified features.

DETAILED DESCRIPTION

Figure 1:
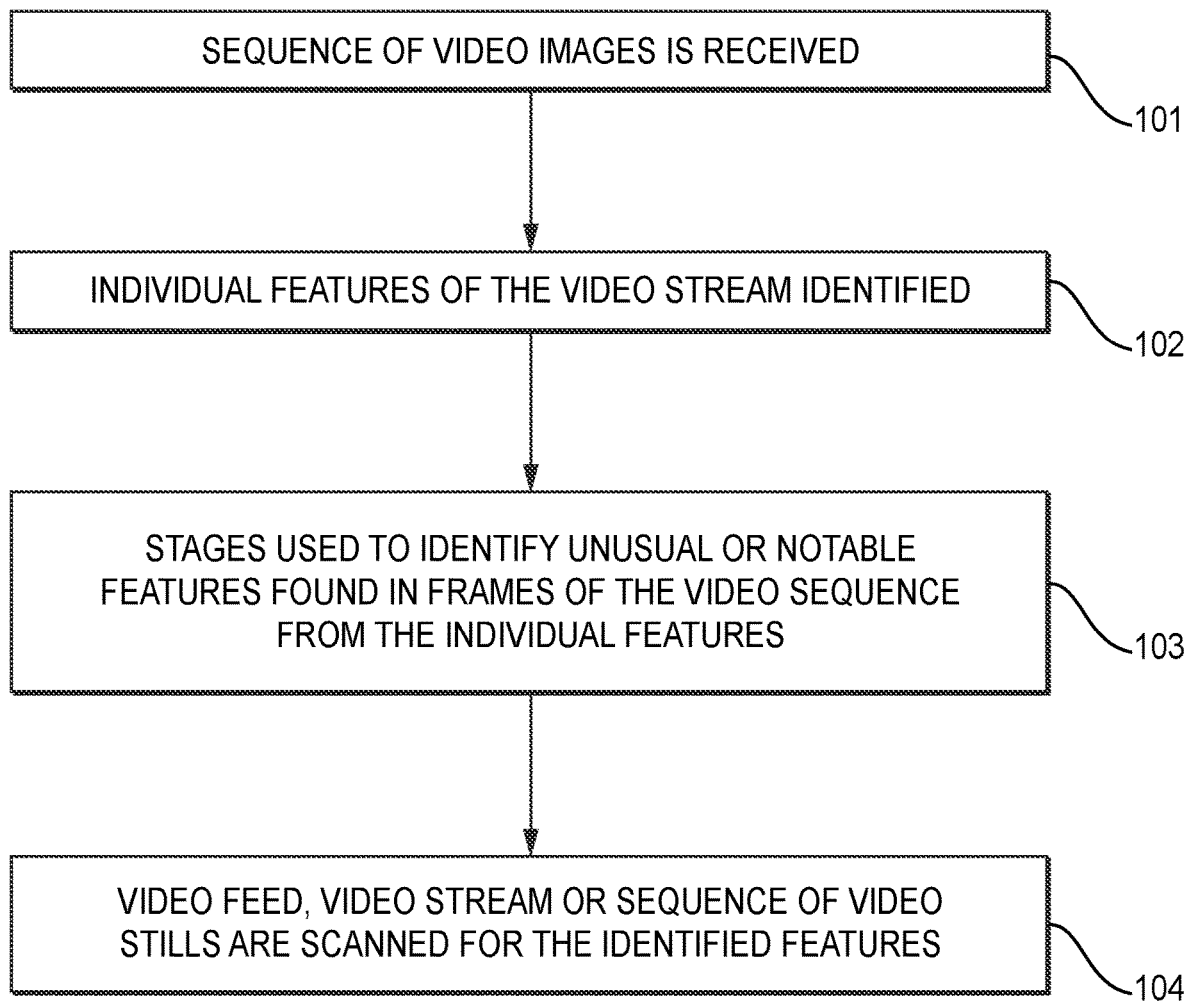
FIG. 1 is a flow diagram showing the disclosed video analysis technique.

Video surveillance plays an important role in identifying events that are not very common such as accidents, fights, aggression, intrusion, robberies, malfunctioning, etc. Identification of such rare events is very important in different domains such as autonomous driving, factories, robotics, virtual reality, security surveillance, smart cities, smart homes, medical imaging, gas stations and many others. This identification is even more challenging in different contexts. For instance, a crowded market during curfew is abnormal but a crowded market is very much normal during a festival. Therefore, rare event detection in videos is a vital research problem and researchers are looking for techniques that are highly intelligent, efficient, reduce risk and cost, and offer valuable insights for decision-making systems.

Video analysis is used to perform rare event detection. Specifically, the disclosed technique implements unsupervised deep learning techniques using spatial and temporal diverse augmentation in generative models for rare event detection in video, such as in video surveillance. A video rendering, such as a video sequence or a series of video frames is received and analyzed for identifiable features. Generative Adversarial Networks (GANs) are used to learn the underlying distribution of normal video frames and their temporal relationships. By incorporating spatial and temporal generators and discriminators, both spatial details and temporal patterns are captured, enabling accurate rare event detection in complex video data. Additionally, a diverse augmentation process is used to enhance the quality and quantity of the training data in order to address the challenge of imbalanced datasets.

Supervised machine learning and deep learning techniques have been extensively explored for rare event detection. Augmentation techniques such as oversampling, undersampling, Synthetic Minority Over-sampling Technique (SMOTE), etc. have been commonly used to address the issue of imbalanced training data. The techniques previously developed for rare event detection are computationally costly in terms of labeling of data. There is also a lack of explainability in those studies, and it is expected that variations and refinements will be developed within the scope of the appended claims to make the techniques more robust and resilient.

According to the present disclosure, an unsupervised deep learning technique is provided for detection of rare events by introducing spatial and temporal diverse augmentation in generative models. To effectively learn the underlying distribution of video frames and their temporal relationships, a modification of a Wasserstein Generative Adversarial Network (WGAN), named Spatial-Temporal Diverse Augmentation in Generative Models for Rare Event Synthesis (STAGES) is implemented. The Wasserstein Generative Adversarial Network (WGAN) is a variant of generative adversarial network (GAN) that aims to improve the stability of learning, avoid problems such as mode collapse, and provide meaningful learning curves useful for debugging and hyperparameter searches. The WGAN implements using a discriminator to provide feedback for a generator used to provide the generative models, to determine a distance from perfection. The distance is considered to be the Jensen-Shannon divergence. The technique implemented by the present disclosure detects rare events by introducing spatial and temporal diverse augmentation in generative models.

In the model, named Spatial-Temporal Diverse Augmentation in Generative Models for Rare Event Synthesis (STAGES), spatial and temporal generators and discriminators are developed to capture both spatial and temporal patterns in videos and hence can accurately detect rare events in complex situations. The challenge of imbalanced training data is addressed by introducing diverse augmentation techniques that will enhance the quality and quantity of training data.

The deep learning techniques may be generalized, meaning applied to all video sequences received, or may be executed individually for each video sequence received. In either case, unusual or notable features found in frames of the video sequence or in the video sequence itself are noted and reviewed according to the WGAN deep learning techniques.

The disclosed technology STAGES uses unsupervised rare event detection in video sequences. STAGES leverages the power of Generative Adversarial Networks (GANs) to effectively learn the underlying distribution of normal video frames and their temporal relationships. By incorporating spatial and temporal generators and discriminators, the disclosed technology can be used to capture both spatial details and temporal patterns, enabling accurate rare event detection in complex video data. Additionally, a diverse augmentation process is implemented to enhance the quality and quantity of training data, addressing the challenge of imbalanced datasets. The disclosed technology provides a robust and efficient solution for detecting rare events in video data, contributing to the advancement of rare event detection techniques and their real-world applications.

The primary objective of practical rare event detection systems is the swift identification of deviations from normal patterns and precise determination of occurrence times. This involves advanced video comprehension to differentiate exceptional events from usual behaviors. Upon detecting a rare event, subsequent classification techniques can offer further insights. Efficient detection is vital as traditional methods require continuous human monitoring, facing challenges with obscured objects, varying crowd densities, and complex settings, resulting in slow and labor-intensive processes. Thus, the drive for automated rare event detection is crucial to reduce human resource involvement and enhance detection accuracy in surveillance.

Technique

FIG. 1 is a flow diagram showing the disclosed video analysis technique. A sequence of video images is received (step 101), either as a video feed or stream or as a sequence of video stills. Individual features of the video stream are then identified (step 102).

Following the identification of individual features in step 102, a STAGES technique is used to identify unusual or notable features (step 103) found in frames of the video sequence from the individual features identified in step 102. The STAGES technique includes the use of spatial and temporal generators and discriminators to capture both spatial and temporal patterns in videos and thereby accurately detect rare events in complex situations. The video feed, video stream or sequence of video stills are scanned for the identified features (step 104).

Figure 2:
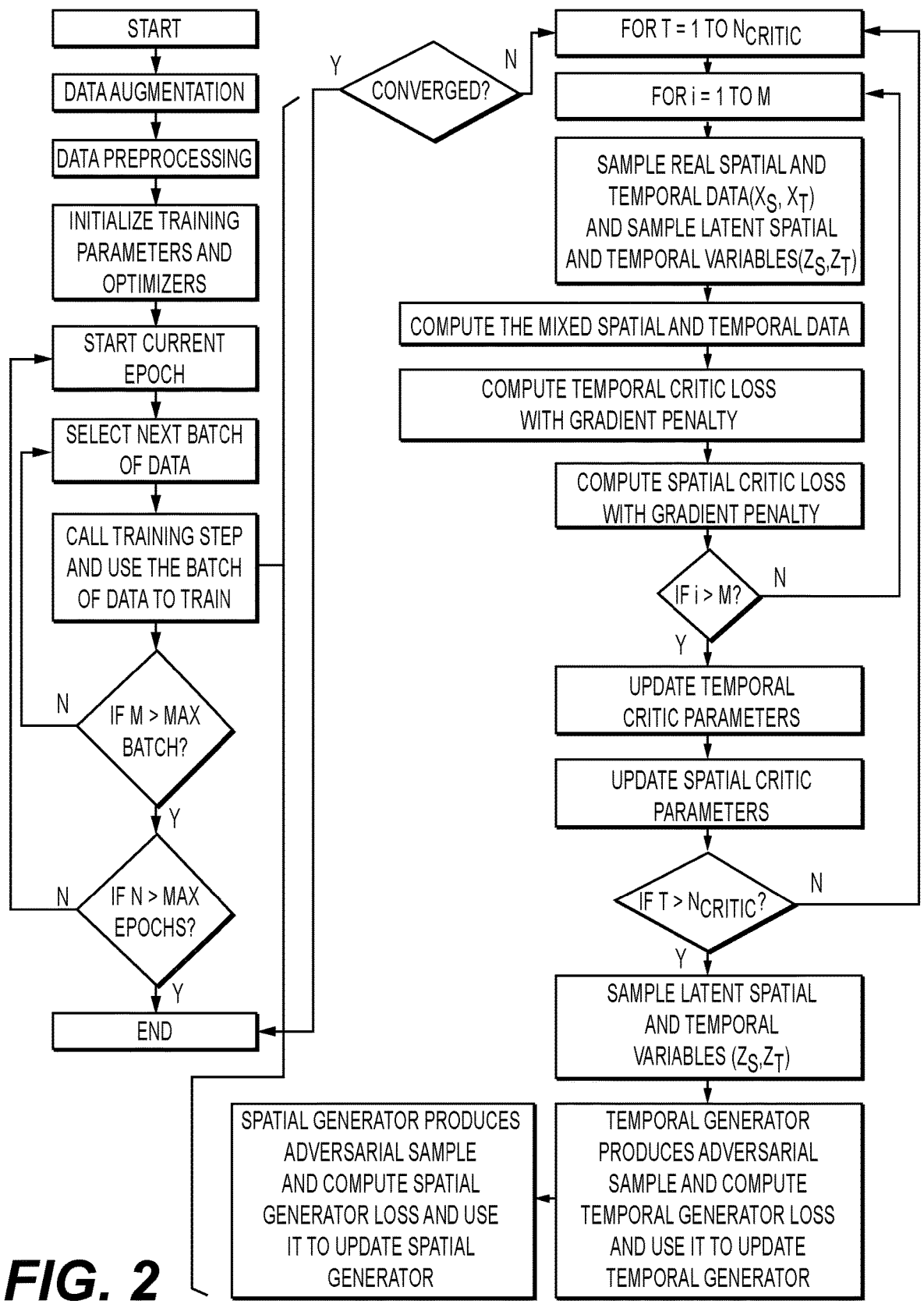
FIG. 2 is a flow diagram showing the disclosed video analysis technique.

FIG. 2 is a flow diagram showing the disclosed video analysis technique.

According to the disclosed technique, the Spatial-Temporal Diverse Augmentation in Generative Models for Rare Event Synthesis (STAGES) is provided as a comprehensive model designed to generate coherent and realistic video content with temporal and spatial consistency. The model leverages both spatial and temporal generators alongside corresponding spatial and temporal discriminators/critics to detect rare events. The central idea behind STAGES is to employ generative adversarial networks (GANs) to create synthetic video frames that closely resemble real-world data, thereby enabling the model to learn and recognize rare events within the generated content.

The framework begins with the input data, which will consist of video streams captured from various surveillance cameras in different environments. These video streams represent continuous sequences of frames.

The framework is divided into three main components: Data Augmentation, Preprocessing of data, and STAGES modeling. Data Augmentation plays a crucial role in extending the training dataset, handling varying conditions, and incorporating a diverse range of augmentation techniques to significantly enhance model performance. The Data Preprocessing step focuses on dimensionality reduction and the calculation of Optical flow, which captures essential motion information from the video data. Finally, the STAGES modeling component takes charge of learning both spatial and temporal features inherent in the video data, effectively determining the rarity of specific events within the video sequences. This comprehensive framework enables the model to excel in detecting rare events by leveraging the power of data augmentation, preprocessing, and advanced generative adversarial network modeling.

The framework addresses the challenge of data augmentation for unsupervised STAGES, a complex task owing to the scarcity of rare events in the training samples. Conventional augmentation methods such as noise addition or mix-up will prove inadequate when dealing with a dataset predominantly composed of normal data. To overcome this limitation, the disclosed technique uses diverse augmentation, which applied not only to the generated data but also to the real data during the model's training phase. This strategy introduces perturbations to both real and generated data instances, thereby promoting smoother decision boundaries and significantly enhancing training stability. By incorporating diverse augmentations, the framework aims to expose the model to a broader range of scenarios, effectively simulating the presence of rare events in the data, even when such events are scarce in the original dataset. This approach is designed to enhance the model's capacity to accurately detect and classify rare events in video sequences:

a. To enhance abandoned baggage detection, diverse augmentation methods are employed, including random cropping, resizing, color adjustments, rotations, noise addition, geometric transformations, histogram equalization, cutout, affine transformation, shadow simulation, and blur effects. These techniques enable the model to recognize abandoned baggage effectively under varying conditions.

b. For unauthorized alteration detection in camera tampering scenarios, strategies such as noise addition, geometric transformations, blur effects, occlusions, lighting variations, reflections, camera flare simulation, image forgery detection, compression artifacts simulation, vignetting, text overlays, and perspective changes are utilized.

c. In activity detection, temporal jittering, cropping, motion blurring, occlusion simulation, lighting variations, scale transformations, frame dropping, speed changes, object insertion, viewpoint shifts, weather variations are applied.

d. In abnormal student behavior detection, pose variations, occlusion simulation, object insertion, lighting changes, viewpoint alterations, temporal shifts, clothing modifications, facial expression manipulation, and background diversification are incorporated to improve model performance.

The Data Preprocessing stage employs the innovative Dynamic Motion-Adaptive Sampling with Uncertainty Estimation (DMA-SUE) algorithm, which will take as input a video sequence, motion threshold, uncertainty model, and refinement parameters, including the number of iterations and threshold values. The flowchart of STAGES as depicted in FIG. 2 and the detail of the pseudocode is given in the STAGES algorithm.

The STAGES algorithm is as follows:
Algorithm 1 STAGES with Temporal and Spatial detection of rare events. Research will use default values of $n_{critic}=5$, $\alpha=0.0001$, $\beta_1=0$, $\beta_2=0.9$ Input: Gradient penalty coefficient $\lambda_{gp}$, weight normalization factor $\alpha_{WN}$, number of augmentation steps $N_{aug}$, MMD regularization weight $\lambda_{MMD}$, divergence penalty weight $\lambda_{div}$ Input: Initial temporal critic parameters $w_{t,0}$, initial spatial critic parameters $w_{s,0}$, initial temporal generator parameters $\theta_{t,0}$, initial spatial generator parameters $\theta_{s,0}$ 1: while $\theta$ has not converged do
2: for t=1 to Neritic do
3: for i=1 to m do
4: Sample real temporal data $x_t \sim P_{x,t}$, real spatial data $x_s \sim P_{x,s}$
5: Sample latent variables $z_t \sim p(z_t)$, $z_s \sim p(z_s)$, random number $\epsilon \sim U[0, 1]$
6: Compute the mixed temporal data: $x'=\epsilon x_t+(1-\epsilon)G_t(z_t)$
7: Compute the mixed spatial data: $x'=\epsilon x_s+(1-\epsilon)G_s(z_s)$
8: Compute the temporal critic loss with gradient penalty:

$$L_{C_t}=D_t(x')-D_t(x_t)+\lambda_{gp}\cdot(\|\nabla_{\hat{x}_t}C_t(\hat{x}_t)\|_2-1)^2$$

9: Compute the spatial critic loss with gradient penalty:

$$L_{C_s}=D_s(x')-D_s(x_s)+\lambda_{gp}\cdot(\|\nabla_{\hat{x}_s}C_s(\hat{x}_s)\|_2-1)^2$$

10: end for
11: Update temporal critic parameters: $w_t \leftarrow \text{Adam}(\nabla_{w_t}L_{c,t}, w_t, \alpha, \beta_1, \beta_2)$
12: Update spatial critic parameters: $w_s \leftarrow \text{Adam}(\nabla_{w_s}L_{c,s}, w_s, \alpha, \beta_1, \beta_2)$
13: end for
14: Sample batches of latent variables $\{z_t\} \sim p(z_t)$, $\{z_s\} \sim p(z_s)$
15: Update temporal generator parameters with MMD regularization and mode exploration:

$$\theta_t \leftarrow \text{Adam}(\nabla_{\theta t}(-D_t(G_t(z_t))+\lambda_{MMD}\text{MMD}(P_{x,t},P_{\theta_t})-\lambda_{div}KL(p_{g_t}\|p_{x_t})),\theta_t,\alpha,\beta_1,\beta_2)$$

16: Update spatial generator parameters with MMD regularization and mode exploration:

$$\theta_s \leftarrow \text{Adam}(\nabla_{\theta S}(-D_s(G_s(z_s))+\lambda_{MMD}\text{MMD}(P_{x,s},P_{\theta_S})-\lambda_{div}KL(p_{g_s}\|P_{x_S})),\theta,\alpha,\beta_1,\beta_2)$$

17: Introduce diverse augmentation on real and generated data:
18: for n=1 to $N_{aug}$ do
19: Perturb real temporal data: $x^{aug}=x_t+\text{noise}$
20: Perturb real spatial data: $x^{aug}=x_s+\text{noise}$
21: Perturb generated temporal data: $x^{aug}=G_t(z_t)+\text{noise}$
22: Perturb generated spatial data: $x^{aug}=G(z_s)+\text{noise}$
23: end for
24: Smooth decision boundaries using diverse augmented data.
25: end while The primary goal of this algorithm is to systematically select frames that exhibit substantial motion and estimate their optical flow, thereby reducing data complexity and enhancing spatial-temporal analysis. The process commences by initializing an empty list to store selected frames and an empty dictionary to house optical flow estimates. Subsequently, the algorithm will iterate through each frame within the input video, evaluating their motion scores using the motion Equation below:

$$MV(x, y, t) = \underset{(i,j)}{\text{argmin}} \sum_{i=-SearchRange}^{SearchRange} \sum_{j=-SearchRange}^{SearchRange} D(I(x, y, t), I(x+i, y+j, t-1))$$

In this equation, MV(x,y,t) represents the motion vector, and (i,j) represent the displacement in the search area. D(I(x,y,t),I(x+i,y+j,t−1)) represents the similarity or difference metric between the current block and the blocks in the search area of the previous frame.

Frames whose motion scores surpass the specified motion threshold are added to the list of selected frames. For each frame in the list of selected frames, uncertainty scores are computed using the standard deviation equation below.

$$\text{StandardDeviation} = \sqrt{\frac{1}{n-1}\sum_{i=1}^{n}(p_i - \bar{p})^2}$$

In this equation, n represents the number of observations. $p_i$ represents the individual observed positions. $\bar{p}$ represents the mean of the observed positions.

A refinement process will follow, executed for a predetermined number of iterations. Within each iteration, frames with uncertainty scores exceeding the refinement threshold will undergo optical flow estimation, utilizing the following Equation:

$$\begin{bmatrix} I_x(p_1) & I_y(p_1) \\ I_x(p_2) & I_y(p_2) \\ \vdots & \vdots \\ I_x(p_n) & I_y(p_n) \end{bmatrix} \begin{bmatrix} v_x \\ v_y \end{bmatrix} = \begin{bmatrix} I_2(p_1)-I_1(p_1) \\ I_2(p_2)-I_1(p_2) \\ \vdots \\ I_2(p_n)-I_1(p_n) \end{bmatrix}$$

In this equation, $I_x(p_i)$ and $I_y(p_i)$L represent the spatial gradients of the image at pixel $p_i$, representing the partial derivatives with respect to x and y directions, respectively. $v_x$ and $v_y$ represent the components of the optical flow vector, representing the estimated horizontal and vertical motion of the pixel. $I_2(p_i)-I_1(p_i)$ represent the intensity difference between the corresponding pixels in frames $I_2$ and $I_1$ at pixel $p_i$ n represent the total number of pixels in the local neighborhood around the pixel of interest. The algorithm updates uncertainty scores using an internal function not explicitly outlined here. Ultimately, upon completion of the algorithm, it will return the list of selected frames, each with its associated optical flow estimates. This preprocessing step, relying on DMA-SUE, efficiently captures spatial-temporal attributes and facilitates subsequent rare event detection in video data.

The core architecture of STAGES consists of four fundamental components: the spatial generator, the temporal generator, and two discriminators/critics, one for spatial and one for temporal domains. The spatial generator, denoted as $G_s$, generates spatial content from random noise $z_s$, while the temporal generator, denoted as $G_t$, focuses on generating coherent temporal sequences from random noise $z_t$. These generators are trained to minimize specific loss functions that guide their learning process.

For the spatial generator $G_s$, its loss function $L_{G_s}$ is formulated as follows:

$$L_{G_s} = -\mathbb{E}_{z_s \sim p_{z_s}}[D_s(G_s(z_s))] + \lambda_{MMD} MMD(P_{x_s}, P_{\theta_s}) + \lambda_{div} KL(P_{g_s} \| P_{x_s})$$

In this equation, $P_{z_s}$ represents the distribution of spatial noise input $z_s$, $D_s(G_s(z_s))$ denotes the discriminator/critic score for generated spatial samples, and $\lambda_{div}$ and $\lambda_{MMD}$ are hyperparameters that regulate the intensity of the divergence penalty and Maximum Mean Discrepancy (MMD) regularization, respectively. The divergence and MMD term encourage the generator to explore different data distribution modes, addressing mode collapse and enhancing sample diversity and training stability.

Similarly, for the temporal generator $G_t$, its loss function $L_{G_t}$ is Structured as follows:

$$L_{G_t} = -\mathbb{E}_{z_t \sim p_{z_t}}[D_t(G_t(z_t))] + \lambda_{MMD} MMD(P_{x_t}, P_{\theta_t}) + \lambda_{div} KL(P_{g_t} \| P_{x_t})$$

In this equation, $P_{z_t}$ represents the distribution of temporal noise input $z_t$, and the terms have similar meanings as in the spatial generator's loss function. These loss functions guide the generators in minimizing the negative discriminator/critic output for their generated data, promoting the creation of authentic samples that closely resemble real data while encouraging diversity and stability through divergence penalties and MMD regularization.

The spatial critic, denoted as $C_s$, is responsible for evaluating the authenticity of spatial content. Its loss function $L_{C_s}$ is structured as follows:

$$L_{C_s} = -\mathbb{E}_{x_s \sim p_{x_s}}[C_s(x_s)] + \mathbb{E}_{z_s \sim p_{z_s}}[C_s(G_s(z_s))] + \lambda_{gp} \cdot (\|\nabla_{\hat{x}_s} C_s(\hat{x}_s)\|_2 - 1)^2$$

The primary objective of this loss function is to guide the spatial discriminator/critic in distinguishing between real spatial data $G_s(z_s)$. The loss consists of three key terms: the negative expectation of $C_s$ applied to real data, the expectation of $C_s$ applied to generated data, and a gradient penalty term. The first term encourages $C_s(x_s)$ to maximize its output for real data, facilitating accurate identification. The second term aims to minimize $C_s(G_s(z_s))$ for generated data, promoting effective differentiation between genuine and generated samples. The third term, the gradient penalty, enforces Lipschitz continuity by penalizing the gradients of interpolated data points, ensuring stable training and smoother decision boundaries. Together, these components guide the spatial discriminator/critic to effectively discern spatial authenticity, contributing to the model's overall performance in rare event detection while maintaining spatial consistency.

Similarly, the temporal discriminator/critic, denoted as $C_t$, evaluates the authenticity of temporal sequences. Its loss function $L_{C_t}$ is structured as follows:

$$L_{C_t} = -\mathbb{E}_{x_t \sim p_{x_t}}[C_t(x_t)] + \mathbb{E}_{z_t \sim p_{z_t}}[C_t(G_t(z_t))] + \lambda_{gp} \cdot (\|\nabla_{\hat{x}_t} C_t(\hat{x}_t)\|_2 - 1)^2$$

The loss function for $C_t$ follows a similar structure but operates in the temporal domain, ensuring that it effectively distinguishes between real and generated temporal sequences.

Hyperparameters, such as the number of critic iterations per generator iteration $n_{critic}$, gradient penalty coefficient ($\lambda_{gp}$), weight normalization factor ($\alpha_{WN}$), number of augmentation steps ($N_{aug}$), MMD regularization weight ($\lambda_{MMD}$), divergence penalty weight ($\lambda_{div}$), Adam hyperparameters ($\alpha, \beta_1, \beta_2$) and initial temporal generator parameters $\theta_t$, initial temporal critic parameters $w_s$, and initial spatial critic parameters $w_t$ are initialized. These parameters control the model's behavior during training. Adaptive training rates are used to dynamically adjust the learning rates during training, optimizing the convergence and performance of the model as it learns to detect rare events.

The STAGES model is trained using the pre-processed and augmented video data. The training process involves adversarial training, where the generators (Gs and Gt) aim to create authentic samples, while the discriminators/critics (Ds and Dt) aim to distinguish between real and generated data. The model optimization includes various loss components, such as adversarial losses, gradient penalties, Maximum Mean Discrepancy (MMD) regularization, and diversity penalties, as previously detailed.

Once the STAGES model is trained, it is ready to detect rare events within video sequences. The model will takes as input a sequence of frames and calculates optical flow data for each frame. It then used the spatial and temporal generators to generate synthetic video frames that exhibit high visual coherence and temporal consistency. These generated frames are compared to the real frames, and the model identifies rare events by detecting inconsistencies and anomalies in the generated frames.

The final output of the framework is the detection of rare events within the input video sequences. Rare events are identified and localized based on the discrepancies between the generated and real frames. The model will provide information on the occurrence, location, and duration of these rare events, which can be used for security and surveillance applications.

This framework leverages the power of the STAGES model, data augmentation techniques, and optical flow analysis to effectively detect and classify rare events in video streams, enhancing security and surveillance capabilities.

After rare events are detected by the model, post-processing steps are applied to localize and visualize these events within the video frames. This may involve drawing bounding boxes around detected objects or events, indicating their spatial and temporal locations within the video. This step involves visualizing the detected rare events within the video frames and generating a performance report. This report summarizes the model's performance based on the evaluation metrics and provides insights into the effectiveness of the rare event detection framework.

The dataset is used for training and evaluating the STAGES model for rare event detection comprises a diverse collection of video footage obtained from various sources, including CCTV cameras and established benchmark datasets. This dataset encompasses a wide range of indoor and outdoor settings, such as parking lots, office buildings, and public parks. The videos are meticulously preprocessed to eliminate any blank or corrupted frames and to standardize lighting and color balance across the footage. Within this dataset, a rich variety of security and behavioral events are captured, including typical activities, instances of abandoned objects, unauthorized parking, camera tampering, and more. Notably, the dataset includes rare event, providing a comprehensive foundation for training and evaluating the model's ability to detect and classify these infrequent occurrences. Additionally, a subset of the dataset consists of video clips recorded within a school environment, recorded via CCTV cameras, contributing valuable samples for the detection of rare student behaviors in a classroom setting.

Several key metrics are employed to assess the performance of the STAGES model for rare event detection. The primary metric is rare event detection accuracy, which measures the model's ability to correctly identify and classify rare events within the video footage. Additionally, precision, recall, and F1-score are calculated to evaluate the model's capability to balance accurate rare event detection with minimizing false positives. Furthermore, the Area Under the Receiver Operating Characteristic Curve (AUC-ROC) and the Area Under the Precision-Recall Curve (AUC-PR) are utilized to gauge the model's overall discriminative power and its performance across varying thresholds. Finally, frame-level accuracy provides insights into the model's accuracy at the individual frame level, especially for scenarios where rare events are of very short duration or intermittent. These metrics collectively offer a comprehensive evaluation of the model's effectiveness in identifying and localizing rare events within video sequences.

Closing Statement

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A video analysis method comprising:
receiving a sequence of video frames;
identifying features of the video frames;
using a modification of the Wasserstein Generative Adversarial Network (WGAN) technique to identify unusual or notable features found in frames of the video sequence as identified features, wherein the using of the WGAN technique comprises spatial and temporal generators and spatial and temporal discriminators to capture both spatial and temporal patterns in videos and thereby accurately detect rare events in complex situations as a Spatial-Temporal Diverse Augmentation in Generative Models for Rare Event Synthesis (STAGES) technique;
scanning the video for the identified features,
using a sequence of the received video frames and calculating optical flow data for each video frame;
using spatial and temporal generators to generate synthetic video frames that exhibit high visual coherence and temporal consistency;
passing the calculated optical flow data of the input video frame to the temporal discriminator to distinguish between real video frame sequences and the generated synthetic video frame sequences;
passing an input video frame from the received sequence of video frames to the spatial discriminator to discern an authenticity of the input video frame,
using the calculated optical flow data for each video frame and the generated synthetic video frames that exhibit high visual coherence and temporal consistency as a model; and
comparing real frames from the sequence of the frames and the model to identify rare events by detecting inconsistencies and anomalies.

2. The video analysis method of claim 1, further comprising:
employing generative adversarial networks (GANs) to create synthetic video frames that resemble real-world data, thereby enabling the model to learn and recognize rare events within content generated content by said scanning the video for the identified features.

3. The video analysis method of claim 1, further comprising:
evaluating motion scores of the sequence of video frames, the evaluation comprising evaluation of a motion vector, evaluation of displacement in a search area, and determining a similarity or difference metric between a current block of video data and the blocks of video data in the search area of a previous frame.

4. The video analysis method of claim 3, further comprising:
establishing the motion score using a spatial generator, a temporal generator, a discriminators/critic for spatial domains and a discriminators/critic for temporal domains.

5. A computer program product, comprising:
a non-transitory computer-readable medium comprising:
a first instruction for causing a computer to receive a sequence of video frames;
a second instruction for causing the computer to identify features of the video frames;
a third instruction for causing the computer to use a modification of the Wasserstein Generative Adversarial Network (WGAN) technique to identify unusual or notable features found in frames of the video sequence as identified features, wherein the using of the WGAN technique comprises spatial and temporal generators and spatial and temporal discriminators capture both spatial and temporal patterns in videos and thereby accurately detecting rare events in complex situations as a Spatial-Temporal Diverse Augmentation in Generative Models for Rare Event Synthesis (STAGES) technique;
a fourth instruction for causing the computer to scan the video for the identified features, and
a further instruction for causing the computer to use the sequence of video frames and calculate optical flow data for each frame, to use spatial and temporal generators to generate synthetic video frames that exhibit high visual coherence and temporal consistency,
to pass the calculated optical flow data of the input video frame to the temporal discriminator to distinguish between real video frame sequences and the generated synthetic video frame sequences;
to pass an input video frame from the received sequence of video frames to the spatial discriminator to discern an authenticity of the input video frame, and to use the calculated optical flow data for each frame and the generated synthetic video frames that exhibit high visual coherence and temporal consistency as a model; and a further instruction for causing the computer to compare real frames from the sequence of the frames and the model to identify rare events by detecting inconsistencies and anomalies.

6. The computer program product claim 5, further comprising:

a further instruction for causing the computer to employ generative adversarial networks (GANs) to create synthetic video frames that resemble real-world data, thereby enabling the model to learn and recognize rare events within content generated content by said scanning the video for the identified features.

7. The computer program product claim 5, further comprising:

a further instruction for causing the computer to evaluate motion scores of the sequence of video frames, the evaluation comprising evaluation of a motion vector, evaluation of displacement in a search area, and determining a similarity or difference metric between a current block of video data and the blocks of video data in the search area of a previous frame.

8. The computer program product claim 7, further comprising:

a further instruction for causing the computer to establish the motion score using a spatial generator, a temporal generator, a discriminators/critic for spatial domains and a discriminators/critic for temporal domains.

* * * * *